(12) United States Patent
Duranton

(10) Patent No.: US 6,405,301 B1
(45) Date of Patent: Jun. 11, 2002

(54) PARALLEL DATA PROCESSING

(75) Inventor: Marc Duranton, Boissy Saint Leger (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/333,633

(22) Filed: Jun. 15, 1999

(51) Int. Cl.[7] ............................................... G06F 15/80
(52) U.S. Cl. ............................ 712/24; 712/10; 712/14; 712/16; 345/721
(58) Field of Search ............................ 712/24, 10, 16, 712/14; 345/721

(56) References Cited

U.S. PATENT DOCUMENTS

| | | | |
|---|---|---|---|
| 5,649,135 A | * | 7/1997 | Pechanck et al. ............ 712/200 |
| 5,787,302 A | | 8/1998 | Hampapuram et al. |
| 6,101,592 A | * | 8/2000 | Pechanck et al. ............. 712/20 |
| 6,173,389 B1 | * | 1/2001 | Pechanck et al. ............. 712/24 |

FOREIGN PATENT DOCUMENTS

EP          0373714 A1       6/1990

* cited by examiner

Primary Examiner—William M. Treat

(57) ABSTRACT

A data-processing arrangement for a plurality of parallel data processors is disclosed. An operation carried out by at least one of the parallel processors is defined by an instruction word or code. The data-processing arrangement includes a control processor that makes compositions of instruction words using instruction-word composing software. A composition (VLIW) of instruction words defines operations which are to be carried out in parallel. The compositions are then provided to each parallel data processor as required. Storage of instruction-word composing software generally requires less memory space than storage of independent VLIW-s for each parallel data processor. The cost-saving this provides generally outweighs any additional costs associated with providing the control processor. Thus, the data-processing arrangement yields better cost and memory efficiency.

12 Claims, 6 Drawing Sheets

FIG. 6

PARALLEL DATA PROCESSING

FIELD OF THE INVENTION

The invention relates to a data-processing arrangement comprising a plurality of data processors for carrying out operations in parallel, an operation carried out by a processor being defined by an instruction word supplied to the data processor.

BACKGROUND ART

European patent application publication number 0,373, 714 describes a data processor comprising a plurality of parallel-operating processor elements. The data processor further comprises a program memory for each processor element. The program memories contain micro-instructions. An activated micro-instruction controls the operation in the processor element. The program memories are connected to two lines. On these lines a reset signal can appear for the memory so that for example an address counter is set to an initial position. The starting of the various program is thus synchronized. On this connection there may also appear initialization information whereby a given memory can be addressed and subsequently filled with program information.

SUMMARY OF THE INVENTION

It is an object of the invention to provide a data-processing arrangement which yields a better cost-efficiency.

The invention takes the following aspects into consideration. A data-processing arrangement usually carries out a certain data processing function in a series processing steps. In a processing step, each processor carries out a particular operation. Thus, in each processing step, there is an instruction word for each processor. A composition of instruction words applied in a processing step can be regarded as a very long instruction word (VLIW).

In the background art, there is a program memory for each processor element and each program memory contains an instruction word for each processing step. That is, the program memories taken as a whole comprise a VLIW for each processing step. Accordingly, the program memories will have a relatively large size and, therefore, they will be relatively costly. This particularly applies if the number of processing steps is relatively large or if the number of processors is relatively large and, even more, if both are large.

What is more, since the program memories in the background art have a relatively large size, it may not be possible to implement them together with the data-processing elements on a single integrated circuit. A bus system will be needed between the program memories and an integrated circuit which comprises the data-processing elements. The bus system will need to carry a VLIW with each processing step. Consequently, the bus system will need to carry a relatively large amount of data per unit of time. The bus system will therefore be relatively expensive.

According to the invention, the data-processing arrangement comprises a control processor for making compositions of instruction words on the basis of instruction-word composing software. A composition of instruction words defines operations which are carried out in parallel. That is, a composition of control words constitutes a VLIW.

Storage of instruction-word composing software will generally require less memory space than storage of VLIW-s as such. The cost-saving this provides will generally outweigh the additional costs associated to a control processor for making compositions of instruction words. Thus, the invention yields a better cost-efficiency.

The invention particularly yields a better cost-efficiency if the data-processing arrangement is in the form of an integrated circuit. This implies that the control processor forms part of the integrated circuit and, thus, that VLIW-s are generated within the integrated circuit. Consequently, any bus system between an external memory and the integrated circuit need not carry VLIW-s. This relaxes requirements on the bus system in terms of bandwidth which contributes to cost-efficiency.

An other advantage of the invention relates to the following aspects. A series of VLIW-s which are successively supplied to the data-processors determines the data processing function which the data-processing arrangement carries out. Let it be assumed that the data-processing arrangement has to carry out a different data processing function. In that case, a new series of VLIW-s has to be supplied to the data processors. If the VLIW-s as such are stored in a program memory, like in the background art, the series of VLIW-s in the program memory needs to be replaced by the new series of VLIW-s. This will generally be labor intensive and time consuming. In contrast, in the invention, only the instruction-word composing program needs to be replaced by a new instruction-word composing program. This will generally be less labor intensive and time consuming than replacing the series of VLIW-s as such. Thus, the invention allows a greater ease-of-use.

The invention and additional features, which may be optionally used to implement the invention to advantage, are apparent from and will be elucidated with reference to the drawings described hereinafter.

BRIEF DESCRIPTION OF THE DRAWINGS

FIG. 6 is a matrix illustrating a programming scheme for a video output unit in the multimedia processor illustrated in FIG. 5.

DETAILED DESCRIPTION OF THE DRAWINGS

The following remarks relate to reference signs. Like entities are designated by like letter references in all the Figures. Several similar entities may appear in a single Figure. In that case, a digit or a suffix is added to the letter reference in order to distinguish like entities. The digit or the suffix may be omitted for convenience or it may be replaced by an asterisk in the case where its value is not important (do not care value). This applies to the description as well as the claims.

Figure 1A:
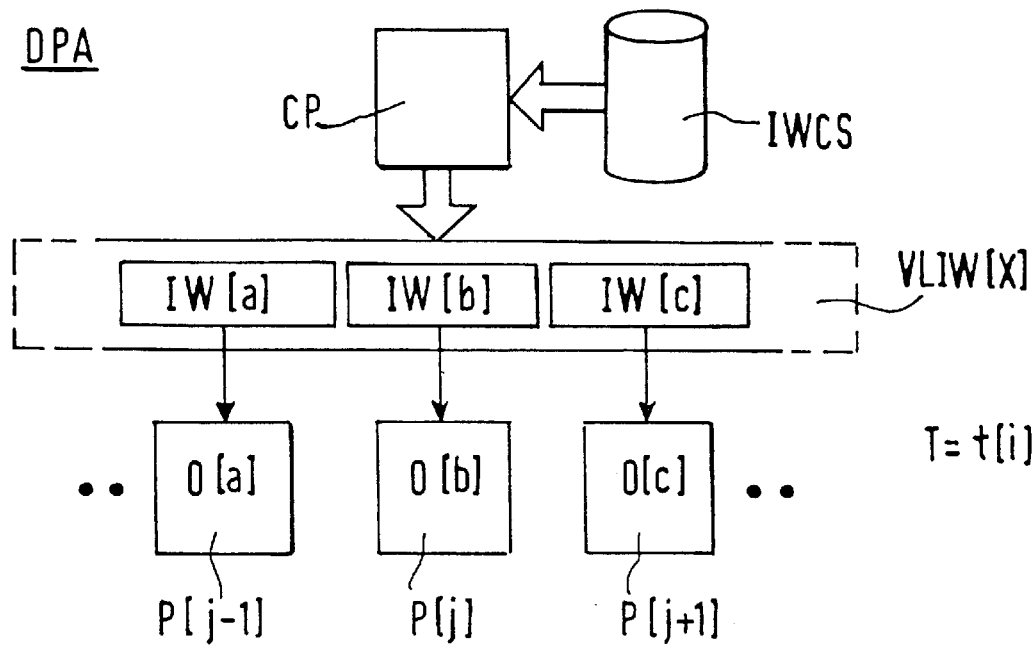
FIGS. 1$a$,1$b$ are conceptual diagrams illustrating basic features of the invention as claimed in claim 1.
Figure 1B:
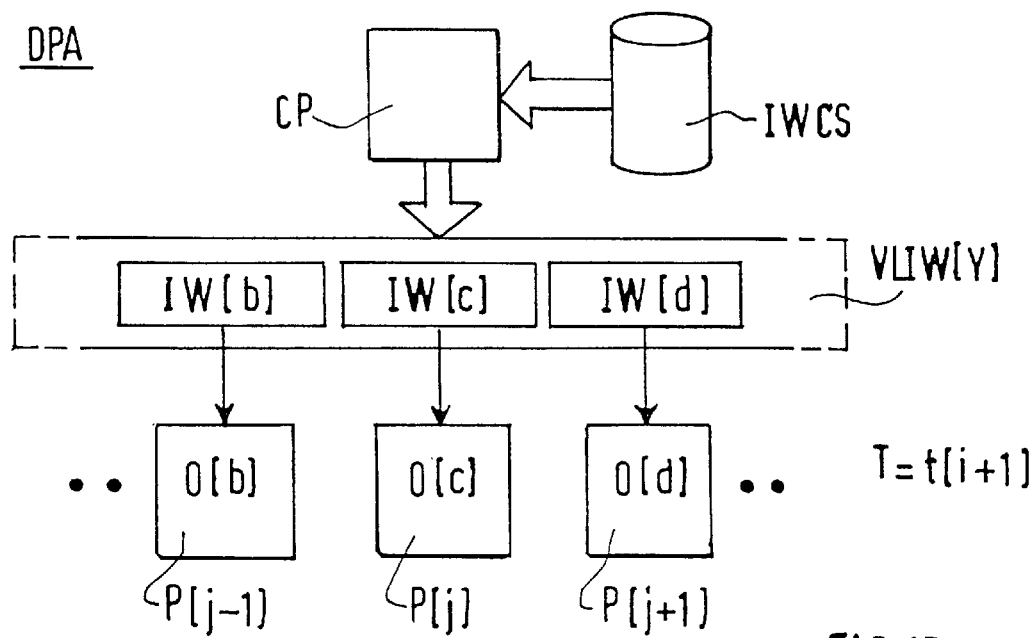

FIGS. 1a,1b illustrate basic features of the invention in solid lines. A data-processing arrangement DPA comprises a plurality of data processors P for carrying out operations O in parallel. An operation O carried out by a processor P is defined by an instruction word IW supplied to the data processor P. The data-processing arrangement DPA comprises a control processor CP for making compositions of instruction words VLIW on the basis of instruction-word composing software IWCS. A composition of instruction words VLIW defines operations O which are carried out in parallel. FIG. 1a illustrates that a composition of instruction words VLIW[x] is applied to the data processors P at a time T=t[i]. FIG. 1b illustrates that a different composition of control words VLIW[y] is applied to the data processors P at a time T=t[i+1].

To advantageously implement the features illustrated in FIGS. 1a,1b, the following aspects have been taken into consideration. In principle, the data-processing arrangement DPA is able to carry out different data-processing functions. Each data-processing function will generally require a specific series of VLIW-s to be applied consecutively. It is possible to develop instruction-word composing software IWCS for each data processing function independently. The instruction-word composing software IWCS for a specific data processing function then generates the required series of VLIW-s.

In practice, the data-processing arrangement will generally be used to process data of a particular type, such as video data for example. In such an application, there will be a certain degree of commonality between different data-processing functions which the data-processing arrangement should be able to carry out. That is, although different data-processing functions require different series of VLIW-s, the different series of VLIW-s will have elements in common, an element being a VLIW as such or a sub-series VLIW-s.

Figure 2:
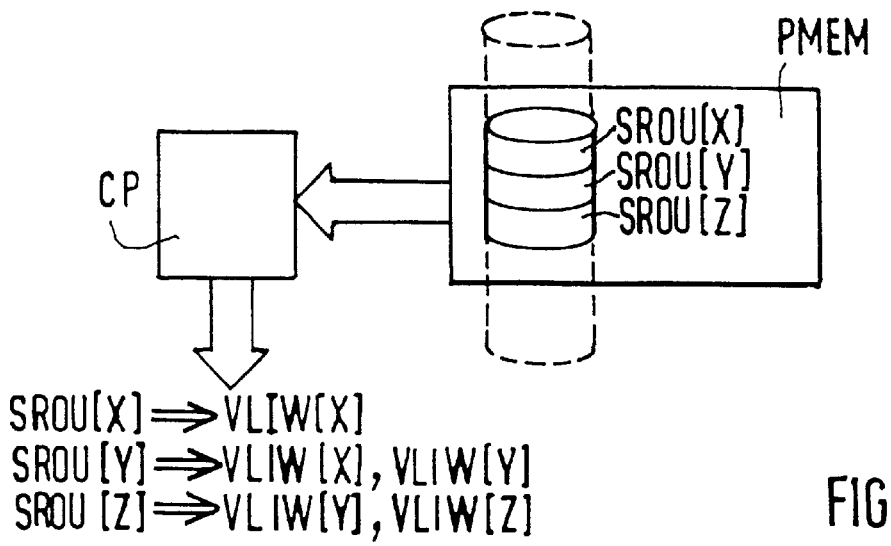
FIG. 2, 3 and 4 are conceptual diagrams illustrating additional features as claimed in claims 2, 3 and 4, respectively.

FIG. 2 illustrates the following features which may be optionally applied in addition to the features illustrated in FIGS. 1a,1b. The data-processing arrangement comprises a program memory PMEM for storing instruction-word composition subroutines SROU. An instruction-word composition subroutine SROU causes the control processor CP to make at least one composition of instruction words VLIW.

The FIG. 2 features provide the following advantages. A sequence of VLIW-s for a data processing function can be described in terms of a sequence of subroutines to be executed. Thus, a new data processing function can be obtained by defining a new sequence of subroutines. This will generally be less labor-intensive and less time-consuming than developing an independent instruction-word composing program. Consequently, the features illustrated in FIG. 2 contribute to ease-of-use.

An other advantage of the features illustrated in FIG. 2 relates to the following aspects. It will require relatively few data to describe a sequence of VLIW-s for a data processing function in terms of a sequence of subroutines. Consequently, it will require relatively little memory space to store this data. Furthermore, the rate at which this data has to be supplied to the control processor will be relatively low. This relaxes the requirements on any bus system via which the control processor receives data. Consequently, the features illustrated in FIG. 2 contribute to cost-efficiency.

To advantageously implement the features illustrated in FIGS. 1a,1b, the following further aspects have also been taken into consideration. In practice, a data processor P will generally have a control register whose content determines the operation of the data processor P. Thus, the control processor CP may compose a VLIW by writing instruction words IW into various control registers. In practice, the control processor CP will be able to write into relatively few control registers per clock cycle. For example, it may be that the control processor CP can write into one control register only per clock cycle. Consequently, it may take the control processor CP several clock cycles to compose a VLIW. In effect, the control processor CP then generates a transitional VLIW with each clock cycle.

Let it be assumed that an instruction word IW takes immediate effect when the control processor CP has written the instruction word IW into a control register. In that case, there should not be any data-processing while the control processor CP is composing a VLIW. This is to prevent that a transitional VLIW affects the data processing. Consequently, a new VLIW may require a relatively long data-processing pause if an instruction word IW takes immediate effect. This particularly applies when the new VLIW differs substantially from its predecessor.

Figure 3:
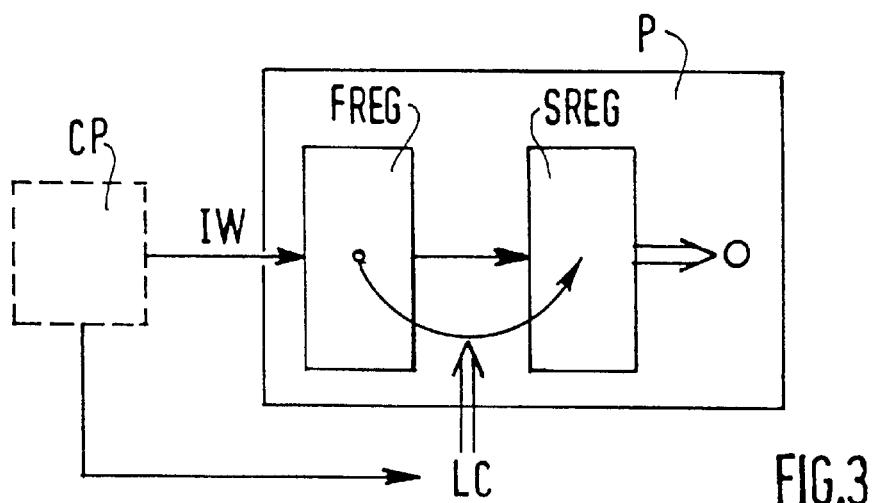

FIG. 3 illustrates the following features which may be optionally applied in addition to the features illustrated in FIGS. 1a,1b. A data processor P has a front register FREG in which the control processor CP may write an instruction word IW. The data processor P further has a shadow register SREG whose content determines the operation of the data processor P. The shadow register SREG takes over the instruction word IW from the front register FREG in response to a load command LC from the control processor CP.

The FIG. 3 features provide the following advantages. An instruction word IW does not take immediate effect when the control processor CP has written the instruction word IW into the front register FREG. The instruction word IW takes effect only when it is transferred to the shadow register SREG. Consequently, the master control processor MCP may write instruction words IW into front registers FREG, and thus compose a new VLIW, while the data processor P process data in accordance with a current VLIW contained in the shadow registers SREG. Any data processing needs to be stopped only when instruction words IW are transferred from the front registers FREG to the shadow registers SREG. This transfer can be done in parallel and, thus, in one clock cycle only. Consequently, the data-processing arrangement can devote a relatively high percentage of time to data-processing as such. Thus, the features illustrated in FIG. 3 contribute to efficiency in data-processing.

To advantageously implement the features illustrated in FIGS. 1a,1b, the following further aspects have also been taken into consideration. It has been mentioned hereinbefore that the control processor CP may compose a VLIW by writing instruction words IW into control registers belonging to various data processors P. In practice, the control processor CP will comprise an arithmetic logic unit for executing instructions belonging to the instruction-word composing software IWSC. The instruction-word composition software IWCS may comprise a write instruction for each instruction word IW to be written into a control register. In that case, the arithmetic logic unit will need to carry out relatively many write instructions in order to compose a VLIW. The arithmetic logic unit will thus have relatively few time available to execute other types of instructions.

Figure 4:
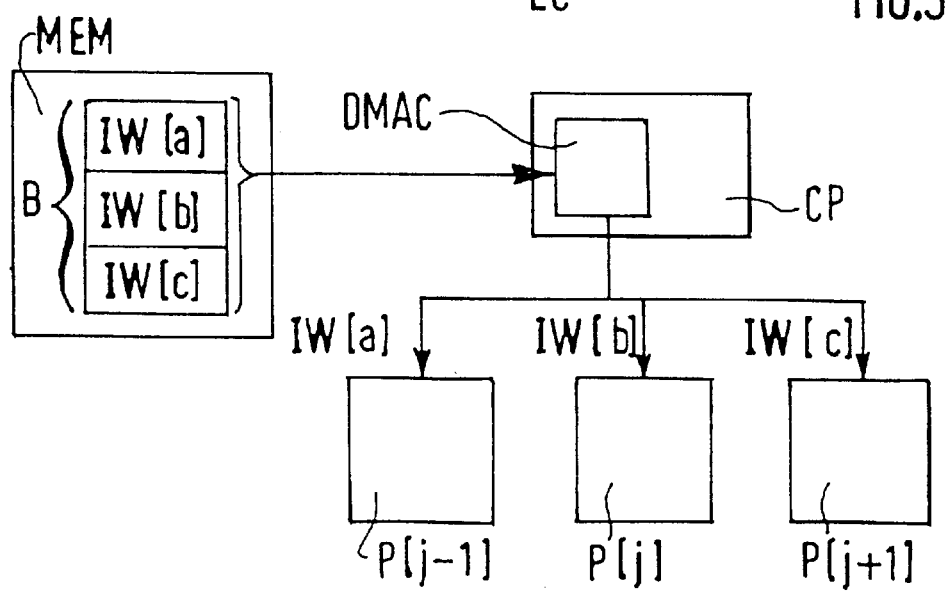

FIG. 4 illustrates the following features which may be optionally applied in addition to the features illustrated in FIGS. 1a,1b. The control processor CP comprises a direct memory-access circuit DMAC. The direct memory-access system DMAC can autonomously transfer a block B of instruction words IW from a memory MEM to several data processors P.

The features illustrated in FIG. 4 provide the following advantages. The control processor CP can make use of the direct memory-access circuit DMAC if a relatively large series of instruction words IW has to be written. It will generally require relatively few instructions to set up the direct memory-access circuit DMAC for a transfer of instruction words IW. Since the direct-memory circuit DMAC can autonomously carry out the transfer, other parts of the control processor CP, such as an arithmetic logic unit for example, can carry out other tasks. Consequently, the features illustrated in FIG. 4 contribute to an efficiency use of the control processor CP.

Figure 5:
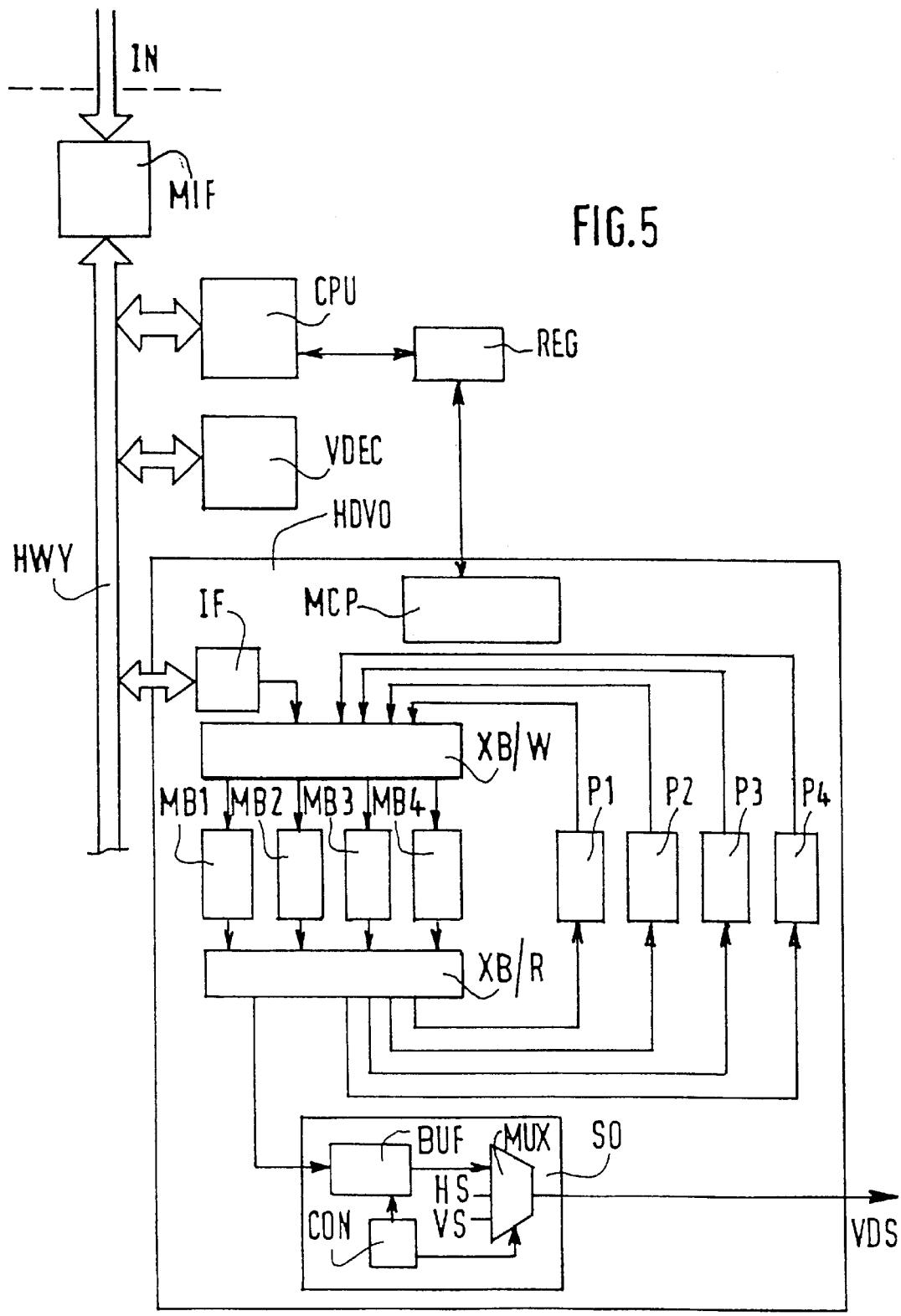
FIG. 5 is a block diagram illustrating an example of a multimedia processor in accordance with the invention.

FIG. 5 illustrates an example of a multimedia processor which incorporates the features illustrated in FIGS. 1–4 described hereinbefore. The multimedia processor processes input data IN comprising coded video data so as to provide, amongst other things, a video data stream VDS adapted for display on a display device. The multimedia processor comprises an main interface MIF, a main bus HWY, a central processing unit CPU, a main instruction register REG and various main processors. Two main processors are shown: a video decoder VDEC and a video output unit HDVO. The video output unit HDVO comprises a master control processor MCP and the following data-handling elements: an interface IF, a read crossbar XB/W, a write crossbar XB/R, memory blocks MB, processors P, and a streaming-out circuit SO. The streaming-out circuit SO includes a buffer BUF, a multiplexer MUX and a controller CON. Each data-handling element has a control register. The control registers, which are not shown in FIG. 5, have a structure as illustrated in FIG. 3. That is, a control register comprises a front register and a shadow register.

The multimedia processor basically operates as follows. The central processing unit CPU controls the various elements of the multimedia processor by means of main instruction words. The main interface MIF fetches the input data IN from an external main memory for example. This memory is not shown in FIG. 5. The video decoder VDEC decodes the coded video data contained in the input data IN. Accordingly, decoded video data is obtained which may be temporarily stored in the external main memory. The video output unit HDVO adapts the decoded video data for display on a particular display device. In addition, the video output unit HDVO may combine the decoded video data with other video data so as to provide features such as picture-in-picture or blending.

The operation of the video output unit HDVO will now be explained in greater detail. The video output unit HDVO alternately carries out configuration steps and processing steps. In a configuration step, the master control processor MCP supplies a load command to the control registers of the data-handling elements. It has been mentioned hereinbefore that each control register comprises a front register and a shadow register as illustrated in FIG. 3. Thus, the shadow register loads an instruction word contained in the front register in response to the load command. Accordingly, the instruction word will determine the operation of the data-handling element concerned during the processing step which succeeds the configuration step. For example, the instruction words loaded in the shadow registers of the crossbars XB/W and XB/R determine connections between, on the one hand, the memory blocks MB and, on the other hand, the interface IF, the streaming-out circuit SO and processors P. A control register supplies a configuration-done signal to the master control processor MCP when its shadow register has loaded an instruction word. The master control processor MCP supplies a start-processing signal to the processors P when it has received configuration-done signals from the control registers of all the data-handling elements. The start-processing signal marks the beginning of a processing step.

In a processing step, each processor P processes a specific number of pixels stored in a memory block MB to which the processor P is connected. The number of pixels which a processor P processes in a processing step does not exceed 256. The number of pixels to be processed may be defined by an instruction word for example. While the processors P are processing pixels, the master control processor MCP may compose a new VLIW by writing new instruction words into front registers of data-handling elements. Once a processor P has processed its number of pixels it will stop processing and supply an end-of-operation signal to the master control processor MCP. The processing step ends when all processors P have supplied an end-of-operation to the master control processor MCP. In response, the master control processor MCP will carry out a new configuration step Accordingly, the video output unit HDVO processes the decoded video data in a block-wise manner. For example, in a first processing step the interface IF writes a block of 256 pixels into memory block MB1 via the write crossbar XB/W. In a second processing step, processor P1 reads the block of 256 pixels from memory block MB1 and processes it. Processor P1 may be, for example, a horizontal video filter which makes a weighed combination of several pixels belonging to the same line. Accordingly, processor P1 provides a block of horizontally filtered pixels and writes this block into memory block MB2. In a third processing step, processor P2 reads the block of processed horizontally filtered pixels from the memory block MB2 and processes it. Processor P2 may be, for example, a vertical video filter which makes a weighed combination of corresponding pixels belonging to neighboring lines. If the block of horizontally filtered pixels belongs to one line, the processor P2 will read other blocks of horizontally filtered pixels belonging to neighboring lines. Accordingly, processor P2 provides a block of horizontally-and-vertically filtered pixels and writes this block into memory block MB3. There may be further processing steps in which processor P3 or P4, or both, further process the block of horizontally-and-vertically filtered pixels contained in memory block MB3. By way of example, it is assumed that the block of horizontally-and-vertically filtered pixels is ready to form part of the video data stream VDS. Accordingly, in a fourth processing step, the block concerned will be transferred from memory block MB3 to the buffer BUF of the streaming-out circuit SO.

The streaming-out circuit SO generally receives a block of processed pixels with each processing step and stores it in its buffer BUF. The streaming-out circuit SO reads the processed pixels from its buffer BUF for providing the video data stream VDS. The controller CON has knowledge of the desired format of the video data stream VDS, for example in terms of line frequency, field frequency, number of pixels per line, and number of lines per field. The controller CON makes that processed pixels are read from the buffer BUF at the right instants and, thus, at the desired rate. The controller CON further controls the multiplexer MUX which receives the pixels and several control signals such as horizontal and vertical synchronization signals HS, VS, for example. Accordingly, appropriate control signals are inserted between the pixels at the right instants.

In effect, the video output unit HDVO is a data-processing chain composed of data-handling elements: the interface IF, the read crossbar XB/W, the write crossbar XB/R, the memory blocks MB, the processors P, and the streaming-out circuit SO. The master control processor MCP determines the composition of the data-processing chain. It also determines the data-handling characteristics of each element in the chain. The master control processor MCP does so by writing appropriate instruction words into the control registers of the data-handling elements. In a matter of speaking, the master control processor MCP can be seen as a foreman of a production hall with various machines. The production hall corresponds to the video output unit HDVO and the machines correspond to the data-handling elements in the video output unit HDVO. The foreman composes a production line and instructs the machines therein what to do. The production line corresponds to the data-processing chain.

Let it be assumed that the video output unit HDVO has to convert a single video signal from one format into an other format in terms of number of lines per frame and number of pixels per line. This can be achieved by a data-processing chain comprising appropriate horizontal and vertical filtering. At the beginning of the format conversion, the data-processing chain first has to be filled with pixels before it is fully operational. At the end of the format conversion, the data-processing chain has to be emptied before it is stopped or broken down as it were.

For example, when the first block of pixels of the video signal to be converted is supplied to the video output unit HDVO, only the data-handling elements which are at the beginning of the data-processing chain should be active. At that time, the memory blocks MB are not yet filled pixels of the frame. With each processing step, more and more memory blocks will be filled with pixels and more and more data-handling elements become active. This continues until each memory block MB in the data-processing chain has been filled with pixels. The data-processing chain is then fully operational and the streaming-out circuit SO can start to provide pixels.

Figure 6:
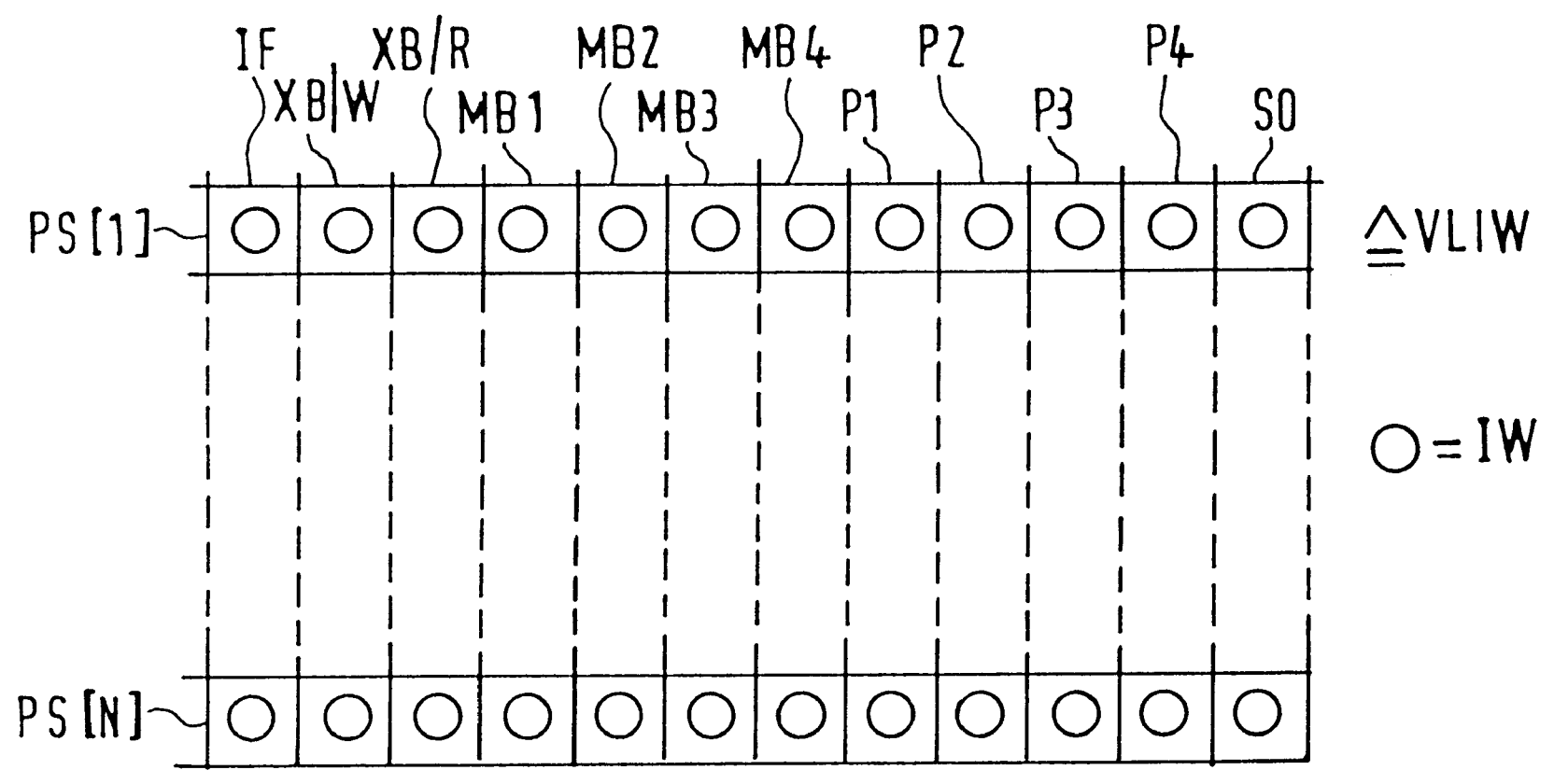

FIG. 6 illustrates a programming scheme for the video output unit HDVO. FIG. 6 is a matrix. The columns of this matrix represent data-handling elements. More specifically, a column represents a shadow register of the data-handling element concerned. The rows of the matrix represent processing steps PS. The cells of the matrix represent instruction words. A VLIW is composition of cells belonging to a certain row of the matrix, that is, a VLIW is a composition of instruction words for a certain processing step PS. A VLIW defines operations which the data-handling elements concerned should carry out in parallel.

The master control processor MCP may compose a VLIW in various manners. For example, the master control processor MCP may compose a VLIW for a particular processing step by writing an instruction word into each control register. However, the master control processor MCP may also compose a VLIW by writing instruction words into one or more specific control registers, whereas it does not write instruction words into the other control registers. The latter control registers keep the instruction words they contained in the preceding processing step.

The matrix illustrated in FIG. 6 may correspond to the display of a frame for example. Processing step PS[1] is the first processing step which is carry out in order to display a frame and processing step PS[N] the last processing step. For example, let it be assumed that a frame has 700 lines and 1024 pixels per line. Let it further be assumed that in a processing step 256 output pixels are typically supplied to the streaming-out circuit SO. This means that there are typically four processing steps PS per line in the video signal and, consequently, that there will be four times 700 processing steps PS per frame which is 2800 processing steps per frame: N=2800.

The first few processing steps PS constitute an initialization phase for the display of a frame and the last few processing steps PS constitute a closing phase. As explained hereinbefore, the processing chain has to filled and emptied step-by-step. This implies that, in the initialization phase and in the closing phase, there is at least one data-handling element for which an instruction word in one processing step is replaced by a different instruction word in the subsequent processing step. This further implies that, in the initialization phase and in the closing phase, there will be a different VLIW for each processing step. The processing steps between the initialization phase and the closing phase may also require various different VLIW-s. A single VLIW can be used throughout the processing steps between the initialization phase and the closing phase if the same processing chain is used throughout the frame. This may be the case, for example, if the video output unit HDVO has only to convert a single video signal from one format to an other format.

Figure 7:
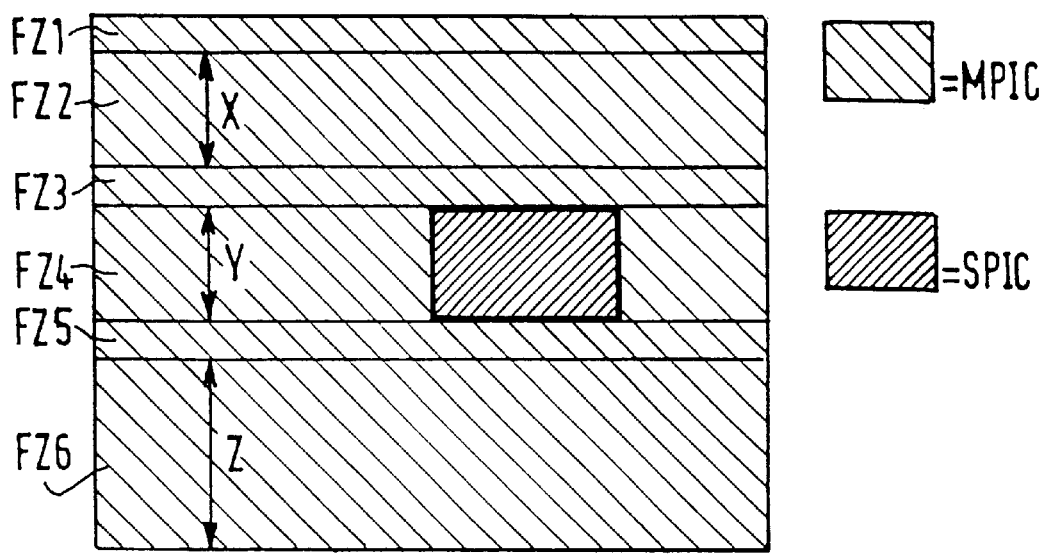
FIG. 7 is a conceptual diagram illustrating a frame which the video output unit has to supply to a display device.

FIG. 7 illustrates a frame which the video output unit HDVO has to supply to a display device. The frame is composed of a main picture MPIC in which a sub picture SPIC is inserted. FIG. 7 further illustrates different frame zones FZ1–FZ6 in the frame. Each frame zone FZ relates to a particular phase in terms of control actions to be carried out by the master control processor MCP shown in FIG. 5.

In frame zone FZ1 the master control processor MCP builds up a processing chain for the display of the main picture MPIC. In frame zone FZ2, the master control processor MCP maintains the latter processing chain. Frame zone FZ2 comprises X lines, X being an integer. In frame zone FZ3, the master control processor MCP breaks down the processing chain for the display of the main picture MPIC and builds up a processing chain for displaying the main picture MPIC and the sub-picture SPIC inserted therein. In frame zone FZ4, the master control processor MCP maintains the latter processing chain. Frame zone FZ4 comprises Y lines, Y being an integer. In frame zone FZ5, the master control processor MCP breaks down the processing chain for displaying the main picture MPIC and the sub-picture SPIC inserted therein and builds up again the processing chain for the display of the main picture MPIC. In frame zone FZ6, the master control processor MCP maintains the latter processing chain. Frame zone FZ6 comprises Z lines, Z being an integer.

Figure 8:
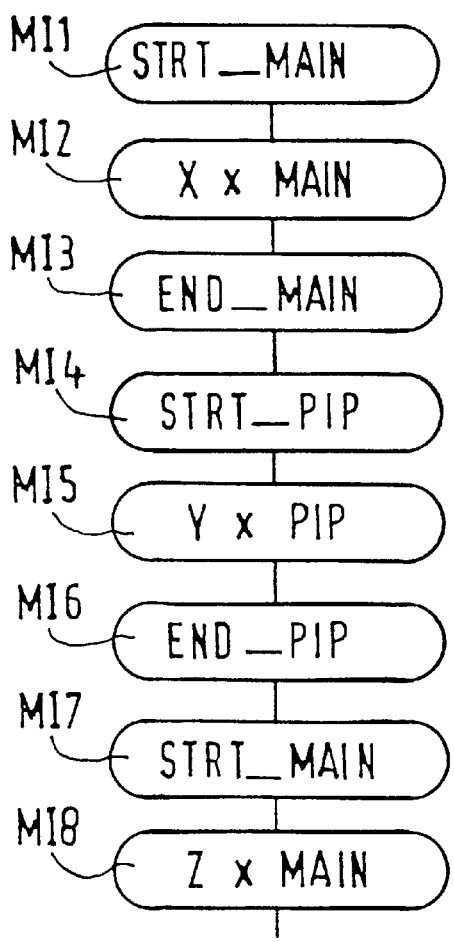
FIG. 8 is a flow chart illustrating a series of main instructions which are supplied to a master control processor in the video output unit.

FIG. 8 illustrates a series of main instructions MI1–MI8 which are supplied to the master control processor MCP in order that it carries out the control actions described hereinbefore. The main instruction MI1 causes the master control processor MCP to execute a sub-routine STRT_MAIN which is stored in an internal memory. The main instruction MI1 may be, for example, the start address of the sub-routine STRT_MAIN. The execution of the subroutine STRT_MAIN generates a series of VLIW-s for the processing steps comprised in frame zone FZ1. For each processing step, a different VLIW is generated and supplied to the data-handling elements of the video output unit HDVO. The series of VLIW-s makes that the processing chain for displaying the main picture is build up processing step by processing step.

The main instruction MI2 causes the master control processor MCP to execute a sub-routine MAIN X times in succession: X×MAIN. The execution of the subroutine MAIN generates a VLIW which is applied for the processing steps comprised in a line. Accordingly, this VLIW is applied throughout the frame zone FZ2. It makes that the data-handling elements carry out the processing necessary for the display of the main picture MPIC.

The main instruction MI3 causes the master control processor MCP to execute a sub-routine END_MAIN. The execution of the subroutine END_MAIN generates a series of VLIW-s for processing steps comprised in an upper part of frame zone FZ3. For each processing step, a different VLIW is generated and supplied to the data-handling elements of the video output unit HDVO. The series of VLIW-s makes that the processing chain for displaying the main picture is broken down processing step by processing step.

The main instruction MI4 causes the master control processor MCP to execute a sub-routine STRT_PIP. The execution of the subroutine STRT_PIP generates a series of VLIW-s for the processing steps comprised in a lower part of frame zone FZ3. For each processing step, a different VLIW is generated and supplied to the data-handling elements of the video output unit HDVO. The series of VLIW-s makes that the processing chain for displaying the main picture MPIC with the sub-picture SPIC inserted therein, is build up processing step by processing step.

The main instruction MI5 causes the master control processor MCP to execute a sub-routine PIP Y times in succession: Y×PIP. The execution of the subroutine PIP generates a VLIW which is applied for the processing steps comprised in a line. Accordingly, this VLIW is applied throughout the frame zone FZ4. It makes that the data-handling elements do the processing necessary for the display of the main picture MPIC with the sub-picture SPIC inserted therein.

The main instruction MI6 causes the master control processor MCP to execute a sub-routine END_PIP. The execution of the subroutine END_PIP generates a series of VLIW-s for processing steps comprised in an upper part of frame zone FZ5. For each processing step, a different VLIW is generated and supplied to the data-handling elements of the video output unit HDVO. The series of VLIW-s makes that the processing chain for displaying the main picture MPIC with the sub-picture SPIC inserted therein, is broken down processing step by processing step.

The main instruction MI7 causes the master control processor MCP to execute the sub-routine STRT_MAIN again, which subroutine has been described hereinbefore. The main instruction M18 causes the master control processor MCP to execute the subroutine MAIN Z times in succession: Z×MAIN. The subroutine MAIN has been described hereinbefore.

It has already been mentioned that, in a matter of speaking, the master control processor MCP can be seen as a foreman of a production hall with various machines. The production hall corresponds to the video output unit HDVO and the machines correspond to the data-handling elements in the video output unit HDVO. In this matter of speaking, the main instructions MI can be seen as production orders which the foreman receives from an upper manager. The foreman translates a production order into instructions for the machines. A collection of instructions to be carried simultaneously, and thus in parallel, correspond to a VLIW.

The main instructions MI1 can be seen as an order to start up a production line for a product A. The main instruction MI2 can be seen as an order to produce X samples of the product A on this production line. The main instructions MI3 and MI4 can be seen as orders to break down the production line for the product A and to start up a production line for a product B. The main instruction MI5 can be seen as an order to produce Y samples of the product B on this production line, and so on.

Figure 9:
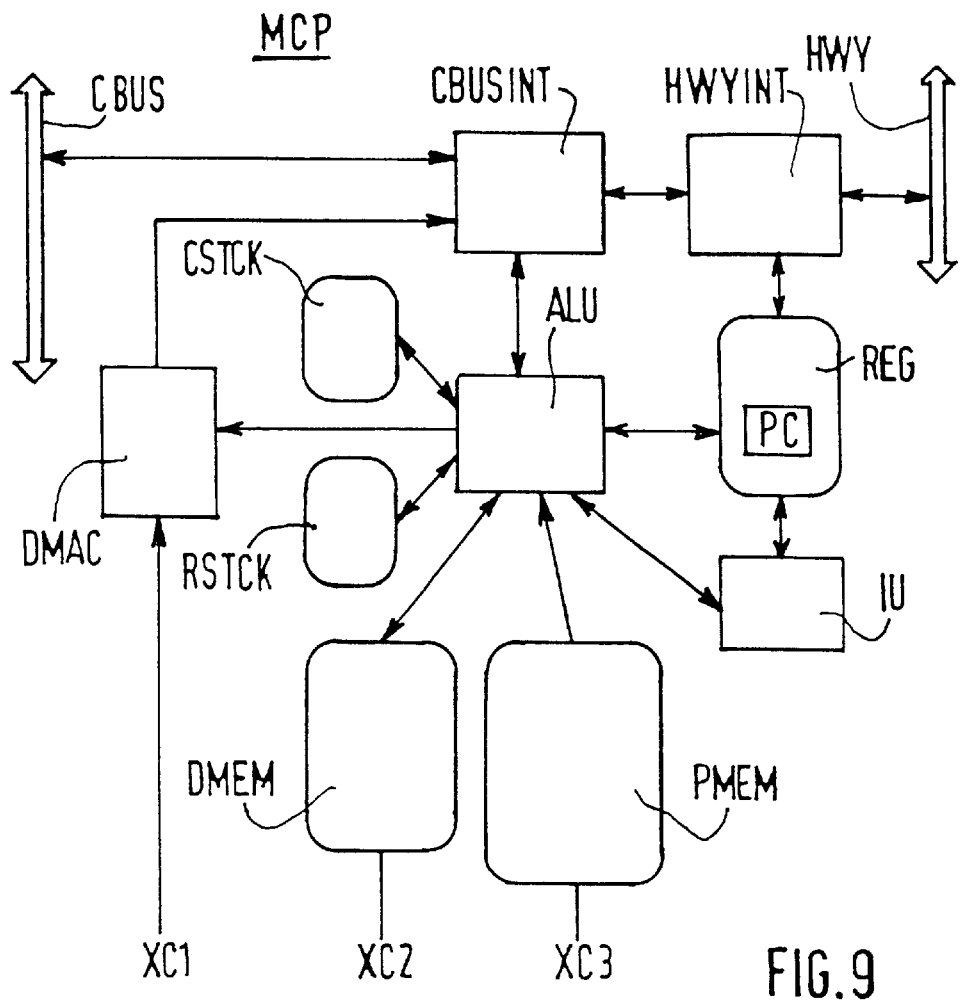
FIG. 9 is a block diagram illustrating an implementation of the master control processor.

FIG. 9 illustrates an implementation of the master control processor MCP shown in FIG. 5. The master control processor MCP communicates with elements outside the video output unit HDVO via the main bus HWY which is also shown in FIG. 5. For example, the master control processor MCP may receive a main instruction via the main bus HWY. The master control processor MCP communicates with the data-handling elements in the video output unit HDVO via a control bus CBUS. For example, the master control processor may send instruction words to the data-handling elements via the control bus CBUS. The master control processor MCP can further receive data from and send data to memory blocks MB in the video output unit HDVO via connections XC.

The master control processor MCP comprises a main-bus interface HWYINT, a control-bus interface CBUSINT, an arithmetic logic unit ALU, an assembly of registers REG including a program counter PC, an assembly of interrupt units IU, a compute stack CSTCK, a return stack RSTCK, a program memory PMEM, a data memory DMEM and a direct memory-access circuit DMAC. The compute stack CSTCK and the return stack RSTCK each have a stack pointer. The stack pointer defines a top location and a second location in the stack concerned. The top location and the second location of the compute stack CSTCK will hereinafter be referred to as TOS and SOS, respectively. The top location and the second location of the return stack RSTCK will hereinafter be referred to as TOR and SOR, respectively.

The master control processor MCP basically operates as follows. The program counter PC contains a program-count value which is typically incremented with each clock cycle. The program-count value may be changed by writing a new program count-value into the program counter PC. The program-count value constitutes an address for the program memory PMEM in which instructions for the master control processor MCP are stored. These instructions will be referred to as MCP instructions hereinafter. An MCP instruction defines an operation which the arithmetic logic unit ALU carries out. It may further define operations for controlling the return stack RSTCK and the compute stack CSTCK as will be explained in greater detail hereinafter. A subroutine for generating VLIW-s as described hereinbefore, is formed by a set of MCP instructions.

The following is an example of a syntax for the MCP instructions. An MCP instruction comprise 24 bits: b23–b0. Bit b23 defines whether an MCP instruction is unconditional or conditional. An MCP instruction is unconditional if bit b23 of the MCP instruction has the value 0 (zero). An unconditional MCP instruction is always executed. An MCP instruction is conditional if bit b23 of the MCP instruction has the value 1 (one). A conditional MCP instruction will be executed only if the least significant bit in a certain register has the value 0 (zero). Bits b22, b21 and b12 are used to distinguish between different types of MCP instructions. Any type of MCP instruction may be unconditional or conditional.

An MCP instruction is a type 0 instruction if bit b22 of the MCP instruction has the value 1 (one). Type 0 instructions serve to write data into an internal memory location which may be a register for example. Bits b21–b12 of a type 0 instruction constitute the data to be written. Bits b11–b0 define an address of a memory location in which the data is to be written. If the memory location has a size which is larger than ten bits, the data is sign extended.

An MCP instruction is either a type 1 or type 1A instruction if bits b22 and b21 are both zero (0). Type 1 and type 1A instructions serve to process data. An MCP instruction is a type 1 instruction if, in addition, bit b12 has the value zero (0). Bits b11–b0 of a type 1 instruction define an address. The data stored under this address forms input data for the arithmetic logic unit ALU. An MCP instruction is a type 1A instruction if bit b12 has the value one (1). Bits b11–b0 of a type1A instruction represent data. This data forms input data for the arithmetic logic unit ALU. The data may be sign extended to form a 16-bit binary word before it is supplied to the arithmetic logic unit ALU.

A type 1 or 1A instruction includes an opcode portion which is formed by bits b20–b17. The opcode portion determines an operation in terms of which processing the arithmetic logic unit ALU carries out on the input data and where the result of this processing is stored. The result is either written into TOS or into the program counter PC. There are 16 different operations for type 1 instructions and also 16 different operations for type 1A instructions. For example, an operation is making an AND combination of the input data and the content of TOS and writing the result of this AND combination into TOS. Other operations can make NOR, XOR, NAND, OR, XNOR combinations.

An MCP instruction is a type 2 instruction if bit b22 has the value zero (0) and bit b21 has the value one (1). Type 2 instructions serve to transfer data. A type 2 instruction includes a transfer-control portion which is formed by bits b20–b17. The transfer-control portion defines source and destination of data to be transferred. More specifically, bits b18–b17 define the source and bits b20–b19 the address of the destination of the data. There are four sources of data: TOS, SOS, TOR or the program counter PC. There are four addresses of the destination: the content of TOS, the content of SOS, bits b11–b0 of the MCP instruction itself with an index value added thereto or without an index value added thereto.

Type 0, type 1 and type 1A instructions primarily serve to generate instruction words for the data-handling elements in the video output unit HDVO shown in FIG. 5. Type 2 data instructions primarily serve to transfer the instruction words thus generated to control registers of the data-handling elements. The latter MCP instructions are, as it were, export MCP instructions.

MCP instructions of the type 1, 1A and 2 include a stack-control portion formed by bits b16–b13. The compute stack CSTCK is controlled in dependence on bits b16–b15 and the return stack RSTCK is controlled in dependence on bits b14–b13. There are four control actions for the compute stack CSTCK and four control actions the return stack RSTCK. The values of bits b16–b15 and bits b14–b13 determine which of the four control action is carried out, respectively.

The four control actions for the compute stack CSTCK are Nop, Cpy, Psh and Pop. The Nop control action does not change the compute stack RSTCK. The Cpy control action copies the content of TOS to SOS. This copying is done before the arithmetic logic unit ALU carries out the MCP instruction. The Psh control action increments the stack pointer. As a result, the location in the stack which is TOS prior to the instruction becomes SOS after the instruction. The content of TOS prior to the instruction is copied to TOS after the instruction which is a new location. This copied content may be overwritten if an operation defined by an other portion in the MCP instruction modifies TOS. The Pop control action decrements the stack pointer. As a result, the location in the stack which is SOS prior to the instruction becomes TOS after the instruction.

The four control actions for the return stack RSTCK are Rnop, Rpc, Rpsh and Rpop. The Rnop action does not change the return stack RSTCK. The control action Rpc increments the stack pointer. A constant value is added to the program-count value and the result of this addition is copied to TOR. The constant value is implementation dependent. The Rpsh action increments the stack pointer. As a result, the location in the stack which is TOR prior to the instruction becomes SOR after the instruction. The content of TOR prior to the instruction is copied to TOR after the instruction which is a new location. This copied content may be overwritten if an operation defined by an other portion in the MCP instruction modifies TOR. The Rpop control action decrements the stack pointer. As a result, the location in the stack which is SOR prior to the instruction becomes TOR after the instruction.

It should be noted that an increment of the stack pointer is done before the arithmetic logic unit ALU carries out the MCP instruction concerned, whereas a decrement of the stack pointer is done thereafter. Thus, a push-type MCP instruction immediately followed by a pop-type MCP instruction will leave the stack pointer unchanged.

It should further be noted that, in principle, any stack-related control action described hereinbefore is carried out independently from an operation defined in the opcode portion of type 1 and 1A instructions. Any stack-related control action is also carried out independently from a data transfer defined in the transfer-control portion of type 2 instructions. Thus, numerous combinations are possible. In case that the opcode-portion defines an operation which involves a content modification of a stack location, for example TOR, and the stack-control portion in the MCP defines a stack-control action which involves a content modification of the same stack location, it is the opcode-portion that has priority.

Figure 10:
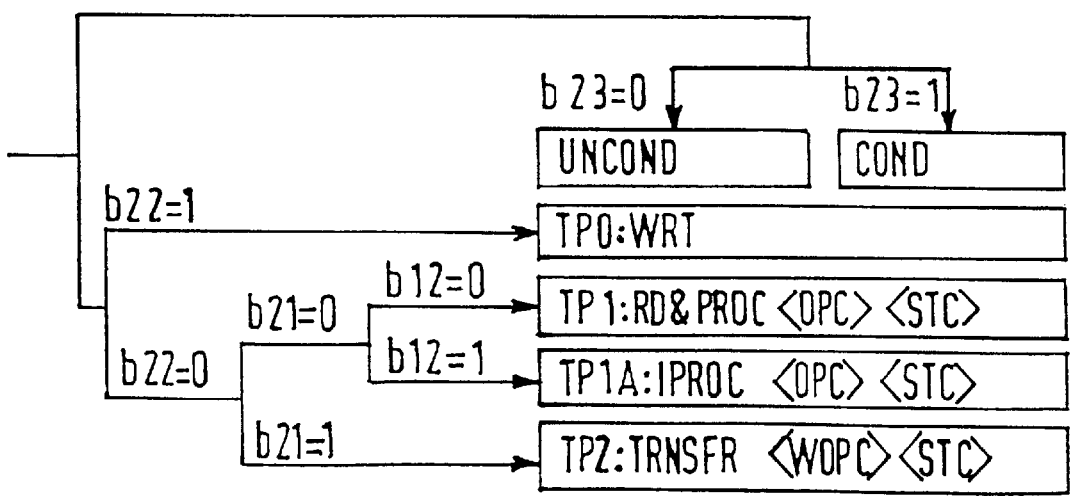
FIG. 10 is a chart illustrating a relation between various types of instructions for the master control processor and bits contained in these instructions.

FIG. 10 illustrates the relation between the various types of MCP instructions described hereinbefore and bits b23–b21 and b12 contained in these instructions. In FIG. 10, reference letters are used to designate the various types of MCP instructions: UNCOND designates an unconditional instruction, COND a conditional instruction and TP0, TP1, TP1A and TP2 designate a type 0, type 1, type 1A, and type 2 instruction respectively. FIG. 10 further includes reference letters which indicate the nature of the latter four MCP instructions. A type 0 instruction serves to write data: WRT. A type 1 instruction serves to read data from an internal memory and to process this data RD&PROC. A type 1A instruction serves to process data contained in the instruction, that is, it serves to immediately process data IPROC. A type 2 instruction serves to transfer data TRNSFR. FIG. 10 further includes letter references which indicate an opcode portion: OPC, a transfer control portion: WOPC, and a stack-control portion: STC.

An MCP instruction may cause the direct memory-access circuit DMAC, shown in FIG. 9, to carry out a direct memory-access session. In a direct memory-access session, the direct memory-access circuit DMAC autonomously transfers a block of instruction words contained in a memory to control registers of various data-handling elements in the video output unit HDVO shown in FIG. 7. The MCP instruction defines a start address and a mode for the direct memory-access session. There are three different direct memory-access modes.

In a first direct memory-access mode, the direct memory-access circuit DMAC writes instruction words in a range of control registers having successive addresses. The first instruction word of the block is written into a control register whose address is the start address, the second instruction word into a control register whose address is the start address plus one, and so on.

In a second direct memory-access mode, the direct memory-access circuit DMAC first reads a template. The template is a binary word in which each bit corresponds to a different control register in a range of control registers having successive addresses. The range begins at the start address. In effect, the direct memory-access circuit DMAC reads the template bit-by-bit and writes the first instruction word of the block into the control register corresponding to the first-read bit whose value is one (1), the second instruction word into the control register corresponding to the second-read bit whose value is one (1), and so on.

In a third direct memory-access mode, the direct memory-access circuit DMAC first reads an offset value before it writes an instruction word into a control register. The instruction word is written into the control register whose address is the address of the control register previously written into, plus the offset value. The first instruction word of a block is written into a control register whose address is the start address plus the first-read offset value.

The master control processor MCP preferably uses the direct memory-access circuit DMAC to compose a VLIW which differs significantly from a preceding VLIW or if there is no preceding VLIW. For example, a direct memory access session can be used to initialize the video output unit HDVO. A direct memory-access session avoids that the master control processor MCP itself must write relatively many instruction words into the control registers. The master control processor MCP delegates, as it were, this task to the direct memory-access circuit DMAC. The direct memory-access circuit DMAC will then make use of the control bus CBUS for writing instruction words into the control registers. Thus, during a direct memory-access session the other elements in the master control processor MCP can not access the control bus CBUS.

The master control processor MCP need not use the direct memory-access circuit DMAC to compose a VLIW which resembles a preceding VLIW. Such a looks-alike VLIW can be composed by modifying the content of relatively few control registers. The master control processor MCP may then directly write new instruction words into the appropriate control registers.

Thus, from a programming point of view there are two techniques for composing VLIW-s. A first technique is to use one or more MCP instructions causing the master control processor MCP to write new instruction words into specific control registers. This technique is preferably applied for composing a looks-alike VLIW. A second technique is to use an MCP instruction causing the master control processor MCP to initiate a direct-memory access session. This technique is preferably used for composing a VLIW which differs significantly from a preceding VLIW or to initialize the video output unit HDVO.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes the implementation of some functional elements or all functional elements as a single physical unit.

Any reference sign in a claim should not be construed as limiting the claim.

What is claimed is:

1. A data-processing arrangement comprising:
   a plurality of processors, at least one operation to be performed by at least one of the plurality of processors being defined by an instruction word supplied to the one processor; and
   a control processor arranged to make at least one composition of instruction words based upon instruction-word composing software, the composition of instruction words defining the operations which are to be performed in parallel.

2. A data-processing arrangement as claimed in claim 1, further comprising a program memory capable of storing instruction-word composition subroutines, an instruction-word composition subroutine being able to cause the control processor to make at least one composition of instruction words.

3. A data-processing arrangement as claimed in claim 1, wherein the plurality of processors comprise a front register in which the control processor writes an instruction word and a shadow register whose content determines an operation to be performed by a respective processor the shadow register (SREG) being loaded with the instruction word from the front register in response to a load command from the control processor.

4. A data-processing arrangement as claimed in claim 1, wherein the control processor includes a direct memory-access circuit for autonomously transferring a block of instruction words from a memory to at least one processor.

5. A method for a data-processing arrangement including a plurality of processors and a control processor, the method comprising the steps of:
   composing, by the control processor, a composition of instruction words, the instruction words defining operations to be performed by at least two of the plurality of processors; and
   performing the composition, by the two processors, in parallel.

6. A method as claimed in claim 5, wherein said composing step includes composing the composition according to instruction-word composing software.

7. A method as claimed in claim 6, wherein the instruction-word composing software is provided to the control processor through a communication medium.

8. A method as claimed in claim 7, wherein the instruction-word composing software is stored in a storage medium.

9. A method as claimed in claim 6, further comprising the step of replacing the instruction-word composing software with updated instruction-word composing software.

10. A memory medium comprising codes for causing a control processor to compose a composition of instruction words for a plurality of processors, the composition defining operations which the plurality of processors are to perform in parallel.

11. A data-processing arrangement comprising a plurality of data processors for carrying out operations in parallel, an operation carried out by a processor being defined by an instruction word supplied to the data processor, characterized in that the data-processing arrangement comprises a control processor for making compositions of instruction words on the basis of instruction-word composing software, a composition of instruction words defining operations which are carried out in parallel.

12. A computer program product for a data-processing arrangement which comprises a control processor and a plurality of data processors, an operation carried out by a data processor being defined by an instruction word supplied to the data processor, the computer program product comprising instruction-word composing software on the basis of which the control processor can make compositions of instruction words, a composition of instruction words defining operations which are carried out in parallel.

* * * * *